(12) United States Patent
Devine et al.

(10) Patent No.: US 7,977,571 B2
(45) Date of Patent: Jul. 12, 2011

(54) METHOD AND APPARATUS FOR PROVISION OF TEMPORARY CONDUCTOR TENSION SUPPORT IN TRANSMISSION OR DISTRIBUTION CIRCUITS

(75) Inventors: Clifford William Devine, Oliver (CA); Daniel Neil O'Connell, Oliver (CA)

(73) Assignee: Quanta Associates, L.P., Houston, TX (US)

( * ) Notice: Subject to any disclaimer, the term of this patent is extended or adjusted under 35 U.S.C. 154(b) by 883 days.

(21) Appl. No.: 11/896,046

(22) Filed: Aug. 29, 2007

(65) Prior Publication Data
US 2008/0054235 A1 Mar. 6, 2008

Related U.S. Application Data

(60) Provisional application No. 60/840,945, filed on Aug. 30, 2006.

(51) Int. Cl.
*H02G 7/02* (2006.01)

(52) U.S. Cl. ............. 174/45 TD; 174/40 TD; 174/40 R; 254/134.3 R

(58) Field of Classification Search ............. 174/19, 174/138 R, 169, 177, 93, 69, 79, 40 R, 42, 174/44, 40 TD, 45 TD, 139; 254/134.3 R, 254/134.3 PA; 29/402.01
See application file for complete search history.

(56) References Cited

U.S. PATENT DOCUMENTS

| | | | |
|---|---|---|---|
| 1,235,999 A | 8/1917 | Neeley | |
| 1,676,584 A | 7/1928 | Tideman | |
| 2,654,796 A * | 10/1953 | Hubbard | 174/139 |
| 3,346,236 A * | 10/1967 | Hubbard et al. | 254/134.3 PA |
| 4,371,018 A | 2/1983 | Arnold | |
| 4,429,858 A | 2/1984 | Dunbar | |
| 4,661,662 A | 4/1987 | Finke et al. | |
| 4,695,039 A | 9/1987 | Clossen | |
| 4,704,500 A | 11/1987 | Shimirak et al. | |
| 4,814,550 A | 3/1989 | Newberg | |
| 5,221,074 A | 6/1993 | Saracini | |
| 5,507,471 A | 4/1996 | Mercurio | |
| 5,543,584 A | 8/1996 | Handford et al. | |
| 5,581,051 A * | 12/1996 | Hill | 174/138 R |
| 6,127,625 A | 10/2000 | Castano | |
| 6,434,810 B1 | 8/2002 | Pigott et al. | |
| 7,097,154 B2 * | 8/2006 | Stevens | 174/40 TD |
| 7,216,850 B2 | 5/2007 | Kwon | |
| 2005/0133244 A1 | 6/2005 | Devine et al. | |
| 2006/0246761 A1 | 11/2006 | Ostendorp | |
| 2007/0158093 A1 | 7/2007 | Barthold | |

* cited by examiner

*Primary Examiner* — Angel R Estrada
(74) *Attorney, Agent, or Firm* — Antony C. Edwards

(57) ABSTRACT

A conductor supporting assembly includes a pair of yokes having a pair of cables extending therebetween in spaced parallel array. Actuators tension the cables so as to selectively draw the yokes toward each other along the cables. Grips cooperate with yokes for mounting the yokes in spaced apart array to and along a conductor segment of a conductor to be serviced so as to extend the conductor segment along and substantially medially between the yokes. The drawing of the yokes toward each other thereby de-tensions the conductor segment to allow for repair or service.

16 Claims, 7 Drawing Sheets

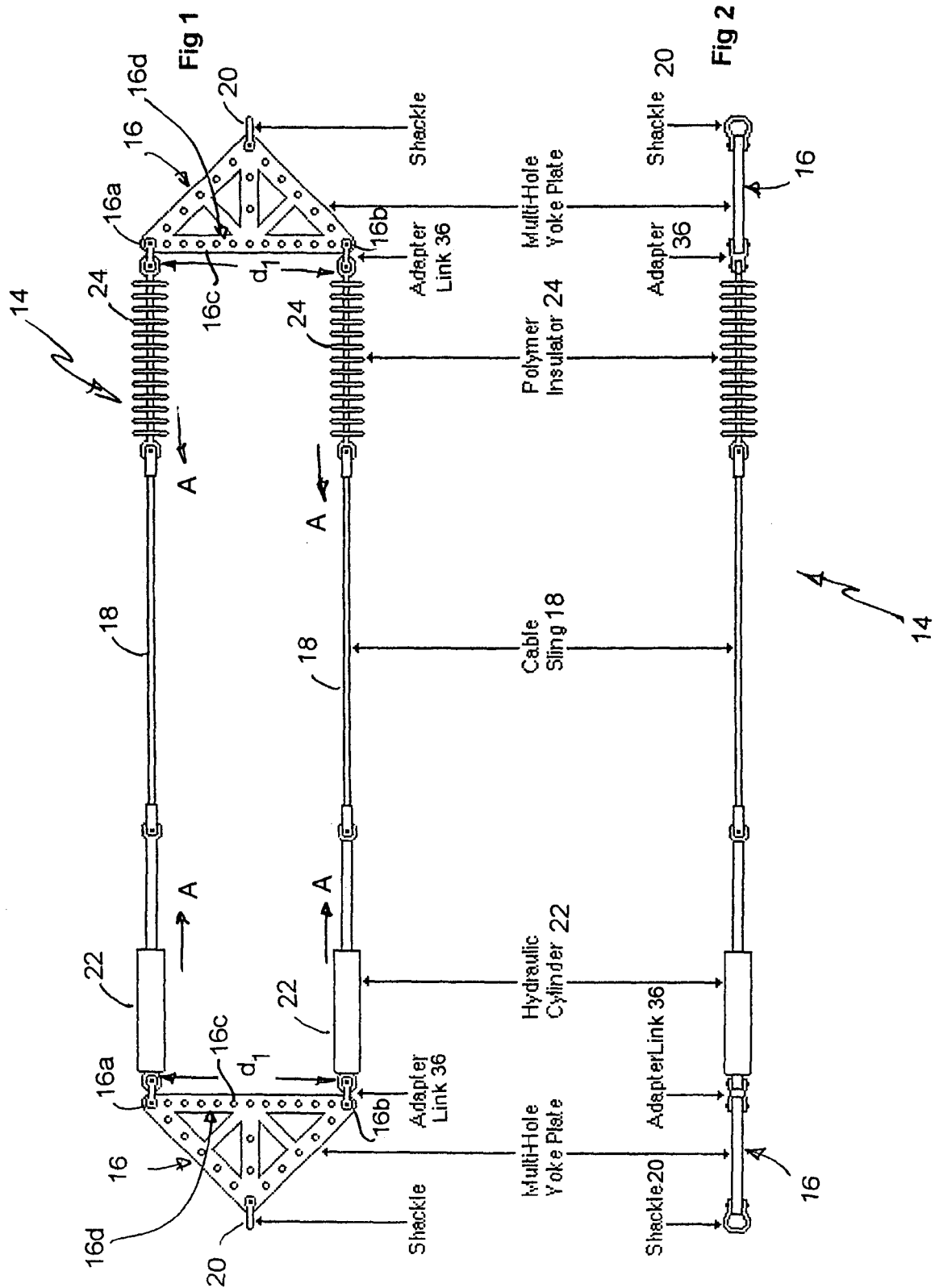

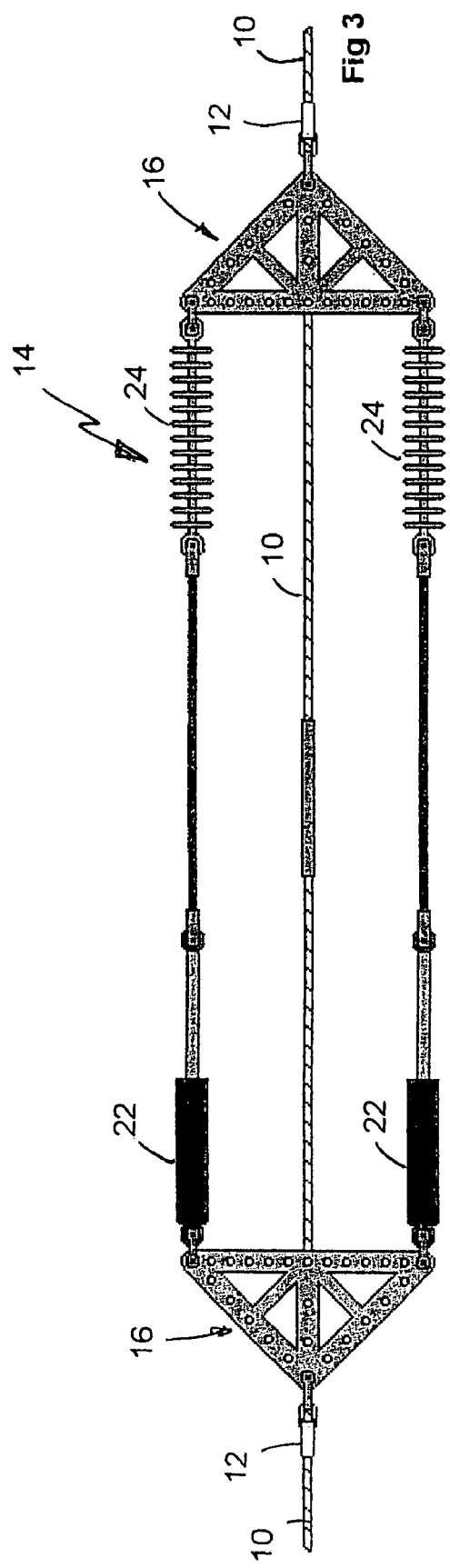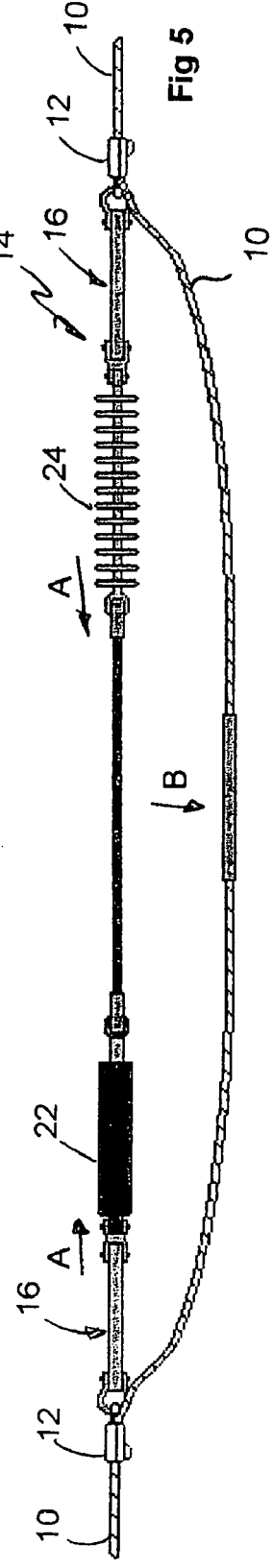

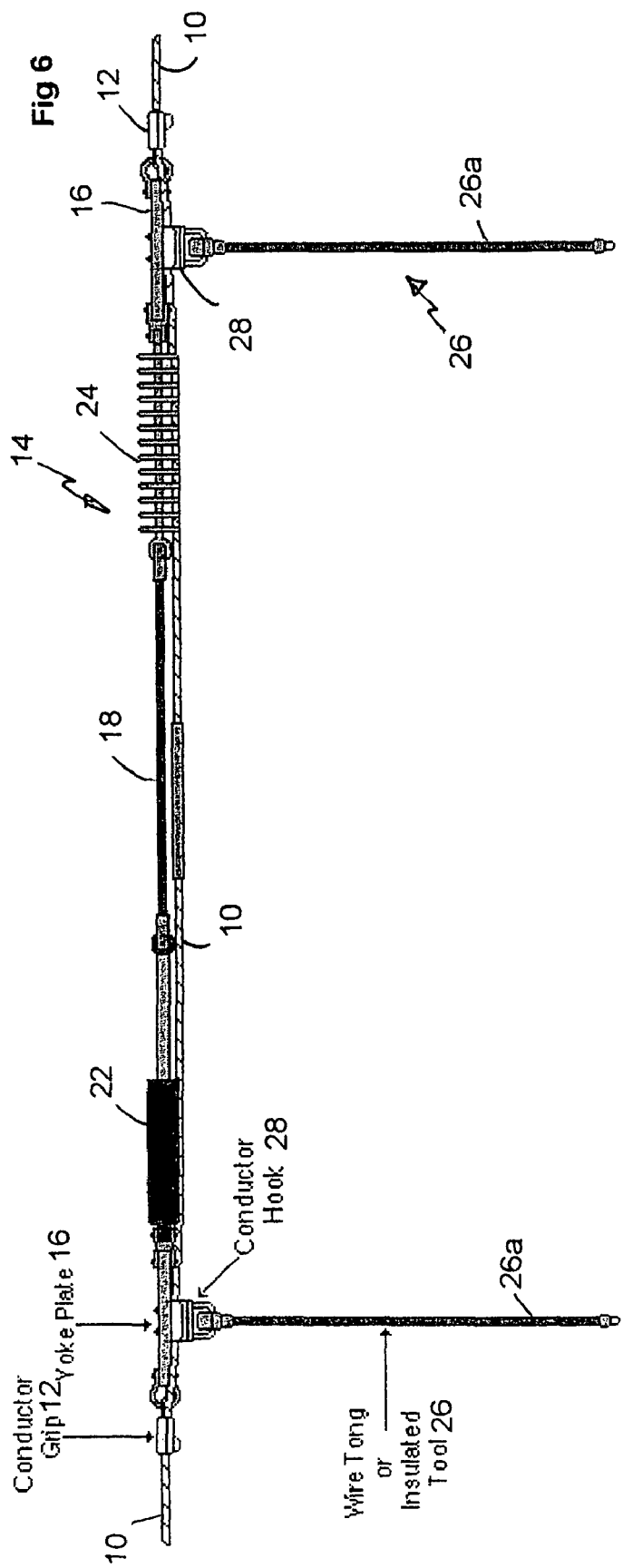

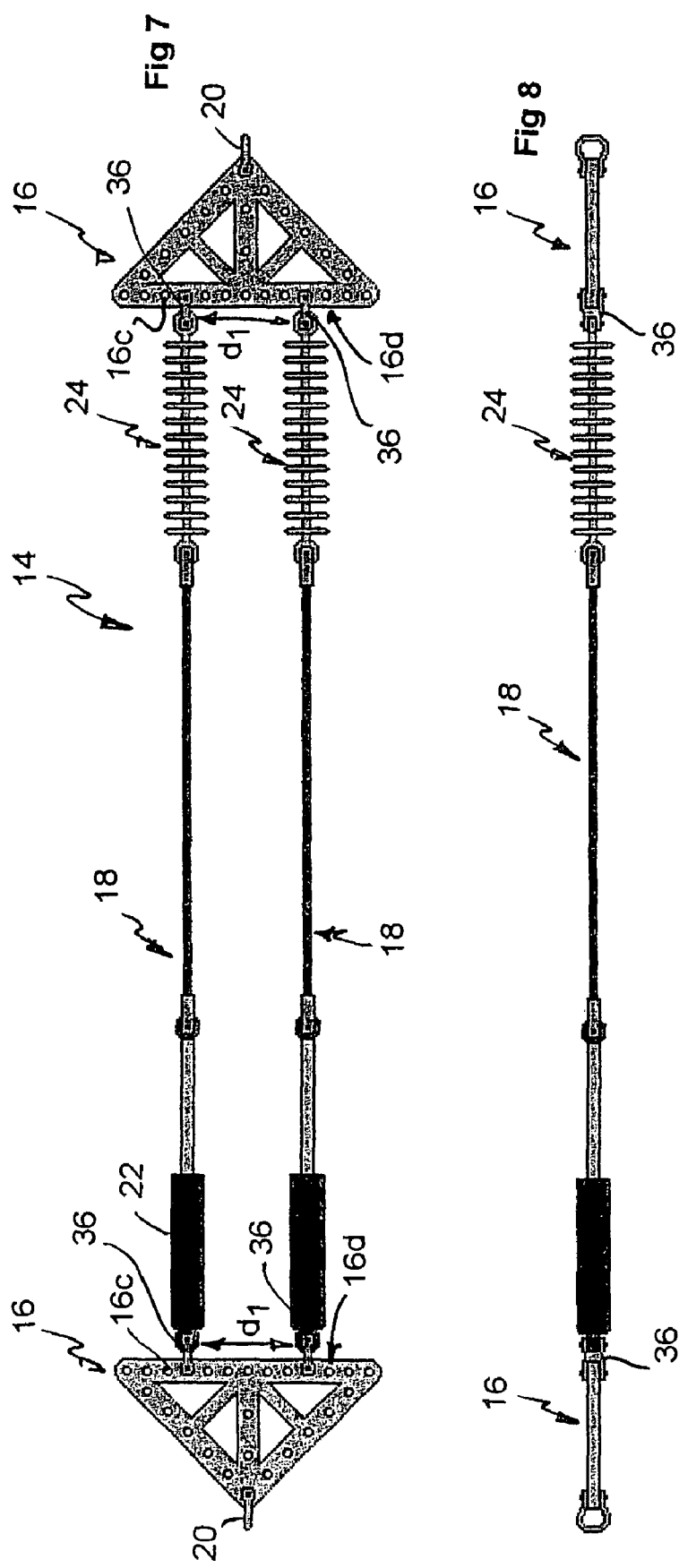

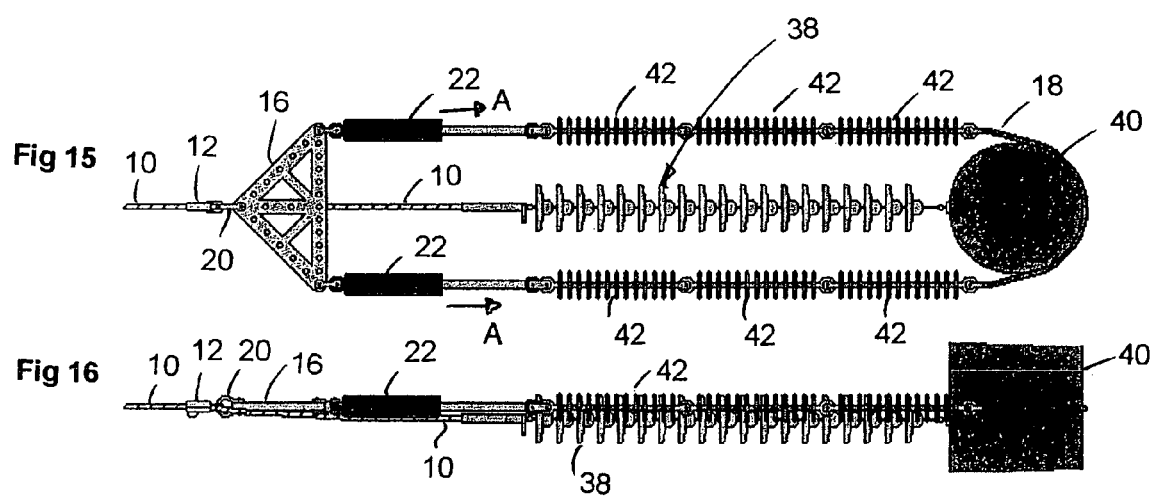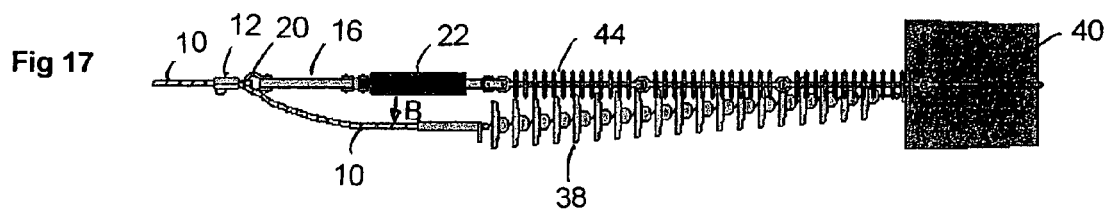

METHOD AND APPARATUS FOR PROVISION OF TEMPORARY CONDUCTOR TENSION SUPPORT IN TRANSMISSION OR DISTRIBUTION CIRCUITS

CROSS REFERENCE TO RELATED APPLICATION

This application claims priority from U.S. Provisional Patent Application No. 60/840,945 filed Aug. 30, 2006 entitled A Method and Apparatus for Provision of Temporary Conductor Tension Support in Transmission or Distribution Circuits.

FIELD OF THE INVENTION

This invention relates to the field of repair and service to power transmission conductors and in particular to a method and apparatus for provision of temporary conductor tension support in transmission or distribution circuits.

BACKGROUND OF THE INVENTION

The replacement of sleeves, dead end insulators, and conductor repair require that conductor tension be maintained or altered so that these processes can be safely applied. Often circumstances require the process to be done while the conductors are energized and remain in service.

Present methods require use of conventional chain jacks, or rope blocks to support tension. These devices are heavy, cumbersome, difficult to install, and because they are conductive present a hazard in their application and use. Also in the prior art applicant is aware of the following United States Patents: U.S. Pat. No. 4,661,662 which issued to Finke et al. on Apr. 28, 1987 for a Power Line Working Apparatus, and U.S. Pat. No. 4,695,039 which issued to Clossen on Sep. 22, 1987 for a Bracket and Repair Method.

The Finke et al. patent provides an apparatus to permit a live electrical power line to be cut in the field for line service. The apparatus is connected at positions spanning the site of the cut and the attached end portions of the apparatus moved closer to each other to thereby ease the tension on the portion of the line to be cut. Jumper cables are then connected to the live line to form a parallel electric circuit, and the line then cut. The disclosed preferred embodiment includes an elongate support rod of highly insulative material having mounting grips at opposite ends thereof. The mounting grips are attached to the power line on opposite sides of the portion of the line to be cut and the grips then moved closer to each other by the operation of a ratchet mechanism having a ratchet arm driving a threaded rod inwardly into the threaded end sleeve thereby easing tension in the line and creating a slack section of the line to be cut.

The Clossen patent describes a bracket and support system for temporarily supporting electrical conductor lines on towers so as to enable repairs or modifications to the suspension system for the conductor lines. A C-shaped tool is supported on the tower while a tensioning means is connected between the tool and the electrical conductor lines. The tensioning means may be tightened or shortened to support the lines so that repairs or modifications may be made to the suspension system ordinarily supporting the lines. The tensioning means may include slings mounted at their opposite ends so as to span the length of conductor lines where supported on the suspension system, and straps extending between the slings and the C-shaped tool. Ratchets mounted on the slings are used to shorten the length of the slings thereby tensioning the slings towards the tool and de-tensioning the section of conductor line between grips on opposite ends of the slings.

SUMMARY OF THE INVENTION

In summary, the conductor supporting assembly according to the present invention may be characterized in one aspect as including an opposed-facing pair of first and second tension supports such as yokes having a parallel pair of flexible first and second elongate members such as cables extending therebetween in spaced parallel array, and a means such as actuators for tensioning the first and second elongate members so as to selectively draw the first and second tension supports toward each other. First and second conductor mounts such as grips, cooperate with the first and second tension supports for mounting the first and second tension supports in spaced apart array to and along a conductor segment of a conductor to be serviced so as to extend the conductor segment along and substantially medially between the first and second elongate members. At least one insulator is advantageously mounted in cooperation with and between the elongate members and the tension supports. The drawing of the first and second tension supports toward each other thereby de-tensions the conductor segment to allow for the service.

In one embodiment the tension supports are yoke assemblies. The yoke assemblies may be substantially planar and may include a rigid spreader element extending orthogonally between the elongate members. Each yoke assembly may be a rigid yoke, or may include a flexible sling extending from a corresponding spreader element. The spreader element may be adjustable along its length so as to selectively adjust a spacing between the elongate members.

At least one elongate insulated tool may be provided which is mountable to a corresponding tension support, for example a yoke, so as to depend downwardly therefrom and stabilize the mounting of the corresponding tension support onto the conductor segment. Advantageously, the tool mounts underneath, in cooperation with, the spreader element.

The present invention also expressly includes within its ambit the corresponding method of producing, mounting or employing the conductor supporting assembly described summarily above and in greater detail below. In particular the method includes:
 a) providing an opposed-facing pair of first and second tension supports such as yokes having a parallel pair of flexible first and second elongate members such as cables extending therebetween in spaced parallel array, and a means such as actuators for tensioning the first and second elongate members so as to selectively draw the first and second tension supports toward each other,
 b) providing first and second conductor mounts such as grips, which cooperate with the first and second tension supports and mounting the first and second tension supports in spaced apart array to and along a conductor segment of a conductor to be serviced so as to extend the conductor segment along and substantially medially between the first and second elongate members,
 c) drawing the first and second tension supports toward each other to thereby de-tension the conductor segment to allow for the service.

In a further embodiment of the method, providing at least one elongate insulated tool and mounting the tool to a corresponding tension support, for example a yoke, so as to depend downwardly therefrom to stabilize the mounting of the corresponding tension support onto the conductor segment.

BRIEF DESCRIPTION OF THE DRAWINGS

FIG. 1 is, in plan view, the conductor supporting assembly according to one embodiment of the present invention.

FIG. 2 is, in front elevation view, the conductor supporting assembly of FIG. 1.

FIG. 3 is, in plan view, the conductor supporting assembly of FIG. 1 mounted to a conductor.

FIG. 4 is, in front elevation view, the conductor supporting assembly of FIG. 3.

FIG. 5 is, in front elevation view, the conductor supporting assembly of FIG. 4 tensioned so as to slacken the conductor between the opposed-facing pair of yokes.

FIG. 6 is, in front elevation view, the conductor supporting assembly of FIG. 4 with an insulated tool mounted to, so as to depend downwardly from, the corresponding yoke.

FIG. 7 is, in plan view, the conductor supporting assembly of FIG. 1 with the cable slings adjusted inwardly relative to the opposed-facing pair of yokes so as to decrease the spacing between the pair of parallel cable slings.

FIG. 8 is, in front elevation view, the conductor supporting assembly of FIG. 7.

FIG. 15 is, in plan view, a further alternative embodiment according to the present invention wherein the conductor supporting assembly is mounted to a support structure so as to relieve the tension on a dead end insulator.

FIG. 16 is, in front elevation view, the conductor supporting assembly of FIG. 16.

FIG. 17 is, in front elevation view, the conductor supporting assembly of FIG. 17, tensioned so as to provide slack in the conductor mounted adjacent the dead end insulator.

DETAILED DESCRIPTION OF EMBODIMENTS OF THE INVENTION

Figure 9:
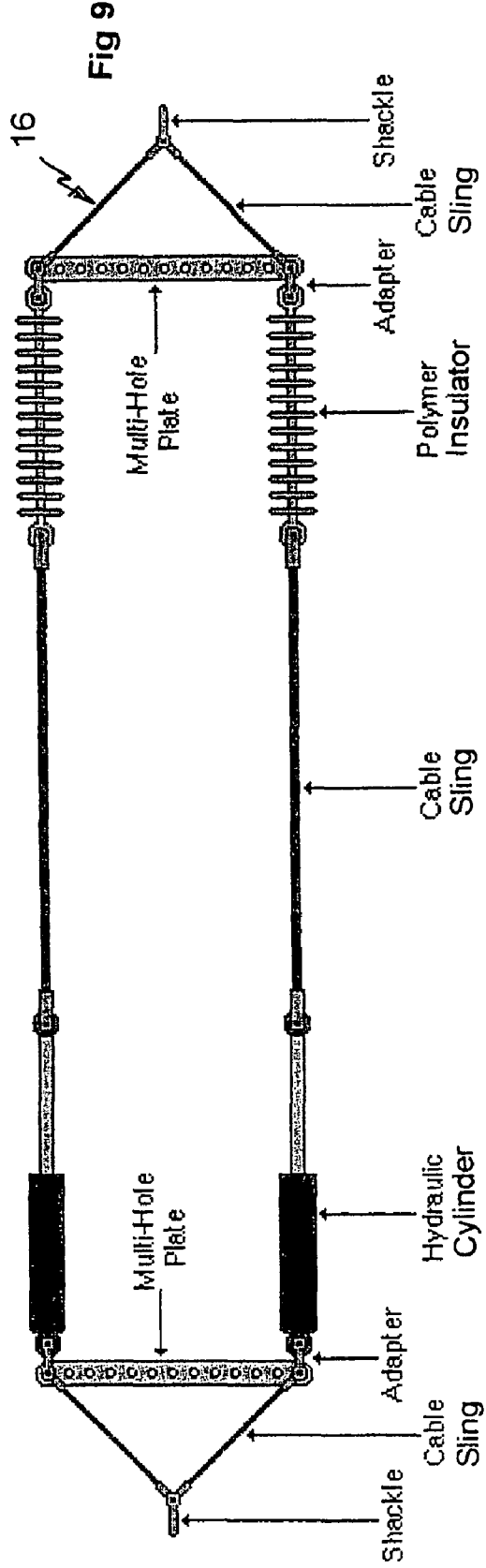
FIG. 9 is, in plan view, a further embodiment of the conductor supporting assembly according to the present invention wherein the rigid triangular yoke of the embodiment of FIG. 1 is replaced with a rigid spreader element supported on a V-shape cable sling.

Conductor 10 is gripped or secured by a single grip such as a conventional conductor clamp 12 on each end 14a and 14b of the conductor support 14 so that tension support 14 is in contact with conductor 10 throughout the length of the repair operation. Yokes 16 provide an appropriate space $d_1$ between the two points of attachment 16a and 16b to, as tension is established on, two cable slings 18. Conductor 10 is slackened between yokes 16 as slings 18 are tensioned in directions A, that is to allow conductor 10 to lower in direction B, thus providing a safe and convenient portion of conductor 10, now relieved from tension, for what ever repair or installation is required.

Figure 10:
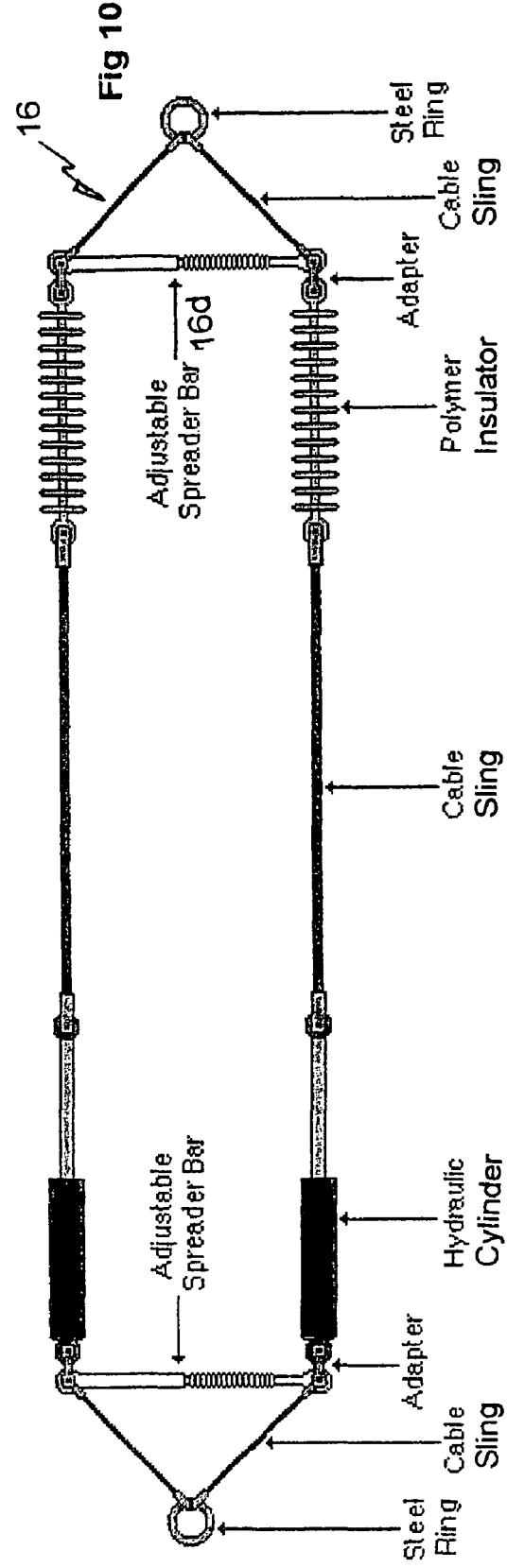
FIG. 10 is, in plan view, a further embodiment of the cable supporting assembly according to the present invention wherein the opposed-facing pair of rigid yokes of FIG. 1 are replaced with a rigid spreader element of adjustable length supported by a V-shape cable sling.
Figures 11, 12:
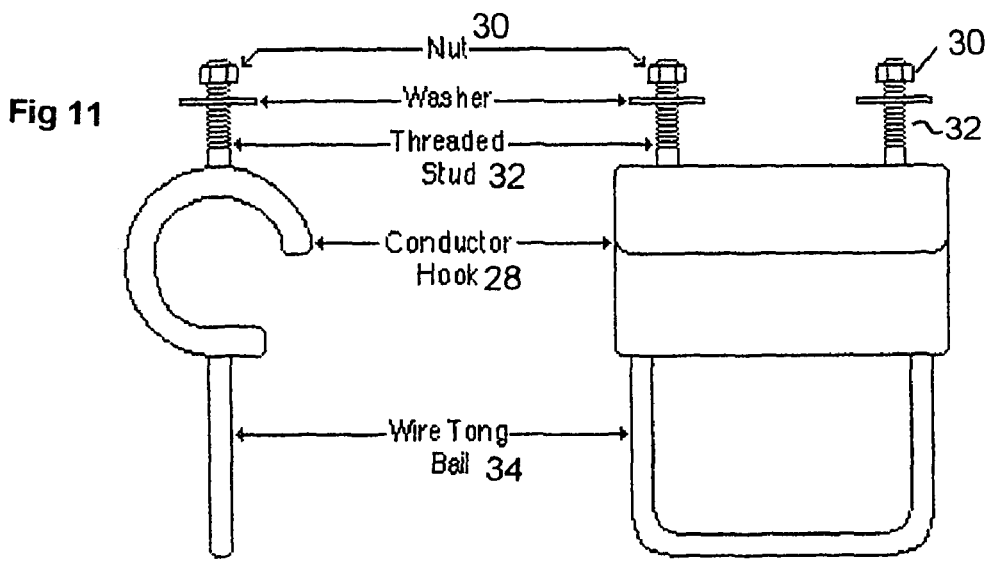
FIG. 11 is, in side elevation view, a conductor hook assembly for use with an insulated tool for mounting under a yoke plate according to one embodiment of the present invention.
FIG. 12 is, in front elevation view, the conductor hook assembly of FIG. 11.
Figure 13:
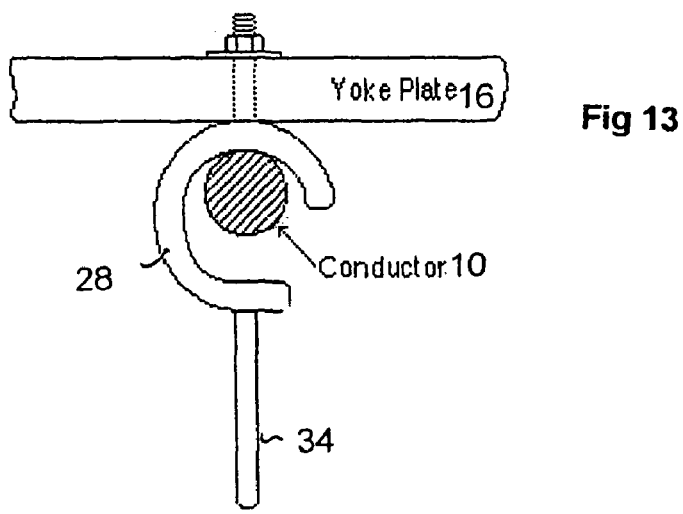
FIG. 13 is, in side elevation view, the conductor hook assembly of FIG. 11 mounted to the underside of the yoke plate of FIG. 1.
Figure 14:
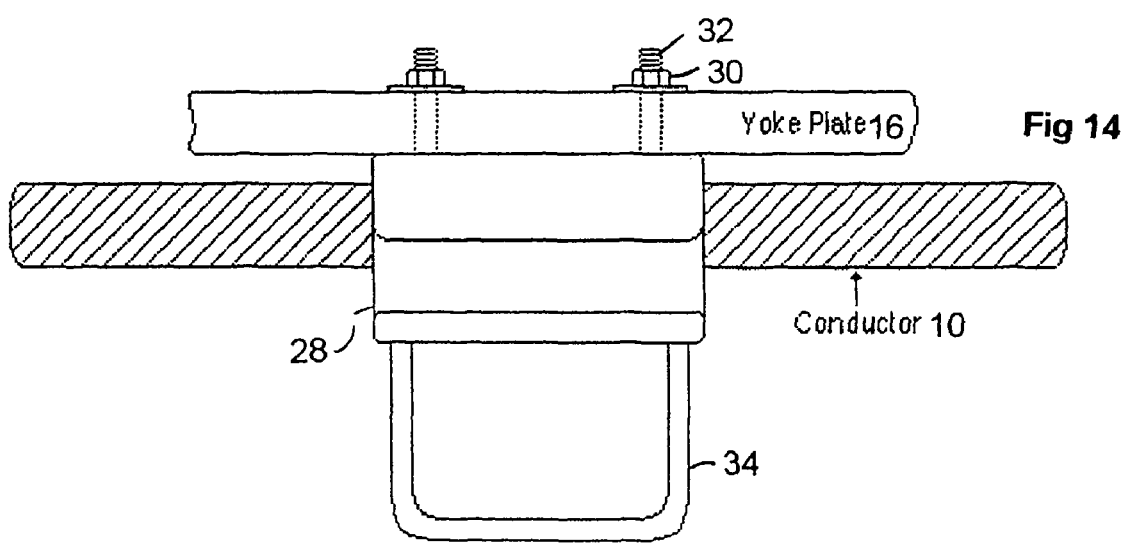
FIG. 14 is, in front elevation view, the conductor hook assembly of FIG. 13 mounted onto a conductor.

Thus tension support 14 consists of two yokes 16, whether they be the plates illustrated in FIG. 1 or the flexible cable and rigid spreader bar yokes of FIG. 9 or adjustable or telescopic spreader bar and cable arrangements of FIG. 10. One yoke 16 is mounted at each end of the length of conductor 10 to be supported, attached to the conductor with an appropriate grip 12 through a shackle 20. Two hydraulic cylinders 22, or other mechanical tensioning devices tension cable slings 18 between the yokes 16. Cylinders 22 draw the two yokes 16 towards each other, thus relieving tension on the conductor between the two yokes. The cylinders or other tension providing devices can be for example hydraulically, electrically, or manually powered.

Cylinders 22 are mounted to a first yoke 16. The other, second yoke has two insulators 24 mounted to ensure that no current flows through cable slings 18, cylinders 22 or other tension providing mechanism between yokes 16. The cable slings between the two yoke plates can be made as long or as short as the particular job requires, and must have sufficient rated strength to support the known tension that they will be subject to.

Both yokes 16 and their corresponding assemblies can be applied or installed using an insulated tool 26 such as for example the wire tong illustrated. Tool 26 is of sufficient length to isolate the installer (not shown) from any electrical hazard. Once a yoke 16 is applied by for example hooking conductor hook 28 over conductor 10 with yoke 16 mounted atop the conductor hook, this insulated tool 26 is left attached and acts as a pendulum so as to keep the yoke 16 properly oriented, for example horizontal, to the conductor segment being repaired or serviced. A yoke 16 may be mounted atop conductor hook 28 by means of, for example, nut and studs 30 and 32 respectively. Conductor hook 28 may be mounted at the tong end of a work pole 26a by means of a bail 34.

In order to provide a current path adequate to the applied load on the subject conductor, a conventional parallel conductor (not shown) must be installed around any intended opening prior to interruption of the normal current path.

This apparatus can be installed on single or bundled conductors by means of appropriate grips and devises of adequate strength to support tension of all sub conductors within the bundle. Depending on the width of the conductor bundle (not shown) the spacing $d_1$ may be increased to the full width allowed by the width of yoke 16 (or to which spacing the yoke may be adjusted for the adjustable width yokes of FIG. 10), or reduced such as seen in FIG. 7. For example, a yoke width may be in the order of eighteen to twenty-four inches, which is not intended to be limiting. Sling assemblies including insulators 24 and cylinders 22 are mounted by means of adapter links 36 for example to a hole 16c in the corresponding array of holes 16c in spreader element 16d of yokes 16.

The changing of dead end insulators 38 or dead end assemblies (not shown) can be achieved by the installation of yoke 16 containing the tensioning devices such as cylinders 24 with cable slings 18 providing support from support tower 40 or structure through appropriate insulating devices 42 applied in series with cable slings 18 and/or tensioning devices 22.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A conductor supporting assembly comprising:
    an opposed-facing pair of first and second tension supports having a parallel pair of flexible first and second elongate members extending therebetween in spaced parallel array, a means for tensioning said first and second elongate members so as to selectively draw said first and second tension supports toward each other, first and second conductor mounts cooperating with said first and second tension supports for mounting said first and second tension supports in spaced apart array to and along a conductor segment of a conductor to be serviced so as to extend the conductor segment along and substantially medially between said first and second elongate members, whereby said drawing of said first and second tension supports toward each other de-tensions the conductor segment to allow for the service, wherein said tension supports are yoke assemblies, and wherein each yoke assembly of said yoke assemblies include a rigid spreader element extending orthogonally between said elongate members.

2. The assembly of claim 1 wherein said each yoke assembly is a rigid yoke.

3. The assembly of claim 2 wherein said each yoke assembly includes a flexible sling extending from a corresponding said spreader element.

4. The assembly of claim 1 wherein said each spreader element is adjustable along its length so as to selectively adjust a spacing between said elongate members.

5. The assembly of claim 1 wherein said yoke assemblies are substantially planar.

6. The assembly of claim 1 further comprising at least one elongate insulated tool mountable to a corresponding tension support so as to depend downwardly therefrom and stabilize the mounting of said corresponding tension support onto the conductor segment.

7. The assembly of claim 6 wherein said tension supports are yoke assemblies each including a rigid spreader element, and wherein said tool mounts underneath, in cooperation with, said spreader element.

8. The assembly of claim 1 further comprising at least one insulator mounted in cooperation with and between said elongate members and said tension supports.

9. A method of supporting a conductor comprising the steps of:
   a) providing an opposed-facing pair of first and second tension supports having a parallel pair of flexible first and second elongate members extending therebetween in spaced parallel array,
   b) providing first and second conductor mounts cooperating with said first and second tension supports and mounting said first and second tension supports in spaced apart array to and along a conductor segment of a conductor to be serviced so as to extend the conductor segment along and substantially medially between said first and second elongate members,
   c) providing a means for tensioning said first and second elongate members and selectively drawing said first and second tension supports toward each other, so as to de-tension the conductor segment to allow for the service, wherein said tension supports are yoke assemblies, and wherein each yoke of said yoke assemblies include a rigid spreader element extending orthogonally between said elongate members.

10. The method of claim 9 wherein said each yoke assembly is a rigid yoke.

11. The method of claim 10 wherein said each yoke assembly includes a flexible sling extending from a corresponding said spreader element.

12. The method of claim 9 wherein said each spreader element is adjustable along its length so as to selectively adjust a spacing between said elongate members.

13. The method of claim 9 wherein said yoke assemblies are substantially planar.

14. The method of claim 9 further comprising at least one elongate insulated tool mountable to a corresponding tension support so as to depend downwardly therefrom and stabilize the mounting of said corresponding tension support onto the conductor segment.

15. The method of claim 14 wherein said tension supports are yoke assemblies each including a rigid spreader element, and wherein said tool mounts underneath, in cooperation with, said spreader element.

16. The method of claim 9 further comprising at least one insulator mounted in cooperation with and between said elongate members and said tension supports.

* * * * *